United States Patent Office 2,741,535
Patented Apr. 10, 1956

2,741,535

AFTERTREATMENT OF DYEINGS AND COMPOSITIONS THEREFOR

Clemens Streck, Loudonville, N. Y., assignor to General Aniline & Film Corporation, New York, N. Y., a corporation of Delaware No Drawing. Application November 15, 1952, Serial No. 320,812

19 Claims. (Cl. 8—74)

The present invention relates to a process for aftertreating dyeings and prints on fibrous material and to the composition employed therefor.

It is known that the wet fastness of dyeings and prints which have been prepared with the help of water soluble dyestuffs may be increased by aftertreatment with aldehyde condensation products. However, said known aftertreatments have most often not been entirely satisfactory. In many instances, the light fastness properties of the after treated dyeings and prints are adversely affected. The compositions employed for the aftertreatment have often had undesirable properties with respect to solubility, stability and the like. In some cases the shade of the treated dyeing or print is affected. Various other difficulties are known to have been encountered.

It is an object of this invention to provide a method and composition minimizing the above-mentioned disadvantages and operative to increase the wet fastness and light fastness properties of dyeings and prints on fibrous materials. Other objects and advantages will appear as the description proceeds.

This invention is based upon the discovery that a composition comprising a copper compound, an aminocarboxylic acid, and an acidic condensation product of formaldehyde, dicyandiamide and an easily-ionizable ammonium salt, when dissolved in an aqueous medium is effective for aftertreating dyeings and prints on fibrous material to improve the wet fastness and light fastness properties thereof.

The acidic condensation product operative in the instant invention is prepared by condensation of about 1.5 to 2.5 moles of formaldehyde and about 0.5 to 1 mole of the ammonium salt per mole of dicyandiamide. The preferred condensation product is one which has been produced by condensing the ammonium salt, formaldehyde and dicyandiamide in molar proportions of, respectively, 0.5: 1.5–2.0: 1.0.

The condensation reaction is exothermic in nature whereby the temperature, initially at room temperature, gradually rises and is maintained at about 80° to 100° C. until the desired condensation product is obtained. Temperatures much above 100° C. are undesirable because formaldehyde and water are boiled off. Therefore, heating or cooling may be necessary to maintain the temperature within the aforementioned optimum range. Lower temperatures tend to retard the reaction and are hence economically undesirable. While about 4 hours are usually sufficient to produce the desired acidic condensation product, the reaction time may in general range from about ½ to 8 hours, depending on the conditions of reaction, proportions of reactants, particular condensation product desired, etc. The pH of the reaction is on the acid side and may range from about 5.0 to 6.8, preferably at about 6.5. While generally unnecessary, acid substances may be added to the reaction mixture to adjust the pH to the desired acid value.

The condensation product thus produced is acidic in nature in that its solution in water has an acid pH which ranges from about 5.5 to 6.8. The nature of the condensation reaction is not definitely known, but it is believed that during the condensation reaction the ammonium salt ionizes to liberate ammonium ion and acidic anion, the latter assisting in rendering the medium acidic and the former taking part in the condensation product. In any case, it has been proven that the ammonium radical reacts and becomes an integral part of the condensation product.

While ammonium chloride is preferred, any other water-soluble, easily ionizable ammonium salt may be used in the reaction, such as the ammonium salt of a strong acid, for example, ammonium bromide, phosphate, thiocyanate, sulfate and the like, or of a weak acid, for example, ammonium acetate and the like. An ammonium salt of a strong acid is preferred, especially one which does not cause precipitation of any of the components of the instant inventive composition or of the condensation product when dissolved in water. However, should such precipitation of the condensation product occur, it can be solubilized by treatment with a strong acid such as hydrochloric acid which will yield a soluble salt of said product.

Any copper compound may be employed in formulating the instant inventive composition, such as the water-soluble chloride, acetate, ammonium chloride and the like, and the water-dispersible or insoluble hydroxide, stearate and the like. Generally, water-soluble copper compounds are preferred because of ease of formulation, application, etc. The term "readily water-dispersible" is employed herein and in the appended claims in its generic sense to describe the above mentioned and similar copper compounds which may be readily dissolved (molecularly dispersed) or dispersed in water.

The aminocarboxylic acid in the composition probably acts as a coordinating agent to form a soluble complex with the copper compound, thereby acting as a stabilizing agent. In the absence of the aminocarboxylic acid, the copper compound tends to precipitate as copper hydroxide as the pH of the solution containing the composition of the instant invention approaches 7 or more. Paradoxically, treatment of the material in the neighborhood of the neutral point is more efficacious. There is also a tendency to precipitate from a solution containing the composition of the instant invention when heated over about 55° C. The addition of the aminocarboxylic acid prevents such precipitation. The preferred aminocarboxylic acid is glycine, but others may be employed, as for example, alanine, aminobutyric acid, leucine, phenylalanine, proline, aspartic acid, glutamic acid, dimethylglycine, diamethyl aspartic acid, sarcosine and the like. Alpha-amino-carboxylic acids are in general operative.

If desired, alkaline acting or amphoteric buffering agents may be added to the composition above described to regulate the pH by bringing it closer to 7 where the composition is at maximum efficiency. While sodium or potassium acetate are preferred, other suitable buffering agents include ammonium acetate, lithium acetate, sodium formate and sodium borate. In general, they include the acetates, formates and borates of ammonium and the alkali metals.

The components of the inventive composition herein may be employed in weight proportions of about 10 to 100 parts of copper compound, 2 to 50 parts of aminocarboxylic acid and 0 to 45 parts of buffering agent for each 100 parts of condensation product. In the absence of a buffering agent, the preferred weight proportions of copper compound, aminocarboxylic acid and condensation product are, respectively, 50:10:100. When a buffering agent is present, the preferred weight proportions of copper compound, aminocarboxylic acid, buffering agent and condensation product are, respectively, 50:10:40:100. The composition is readily soluble or dispersible in aqueous media to provide a bath suitable for aftertreating dyeings and prints in accordance with this invention. The presence of the aminocarboxylic acid in the composition prevents precipitation which would tend to occur when the normally acidic aqueous bath is adjusted towards the neutral point.

Since the composition of this invention is substantive in nature, the treatment of dyeings and prints proceeds by an exhaustion process. Accordingly, it will be readily understood that if enough time is allowed, the amount of composition to be dissolved in the aftertreating medium will depend upon the amount of fibrous material to be treated and the proportionate amount of dye on the fiber. It will also be understood that variable factors such as concentration, duration, temperature of treatment, fiber-liquor ratios and the like, will in any particular instance be interrelated and dependent upon the function and results desired. Control of these variables will be obvious to a worker skilled in the art.

In general, the aftertreatment of dyeings and prints is carried out at about 140° to 160° F., but can be raised or lowered as conditions require. Similarly, while 20 to 30 minutes are usually sufficient, the duration of aftertreatment may depart from this range depending on other factors. The usual concentration is about 2% of the composition based on the weight of the fiber, but may vary therefrom depending on the amount of dye on the fiber, depth of shade desired (less for pastels, more for heavy shades), and the like. The pH is generally that of the aqueous solution of the instant invention, although values approaching the neutral point have been found highly effective. pH values of about 5.5 to 7.0 may be employed. The treated dyeings and prints are dried in the usual manner, no curing being necessary.

The dyeings and prints to be aftertreated in accordance with this invention may be made with any water soluble substantive dyestuff. The instant invention is particularly advantageous for aftertreating dyeings and prints made with direct azo dyestuffs which have an o-hydroxy or o,o'-dihydroxy group or contain a group or groups readily convertible to these, or azo dyes which contain a salicylic acid radical.

The following dyestuffs are given for illustrative purposes only:

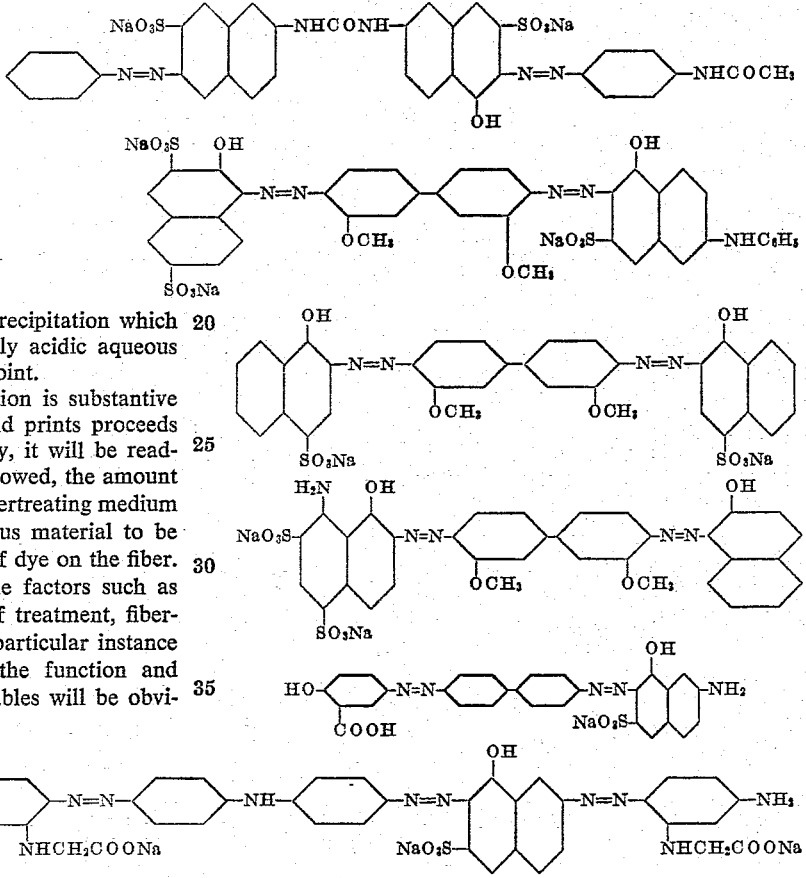

The fibrous material containing such dyestuffs may have a basis of cellulosic materials such as cotton, linen, rayon, and the like, animal fibers such as wool, silk and the like, synthetic polymeric material and other fibers in any form or shape.

The following examples illustrate the invention but are not to be regarded as limitative, parts being by weight unless otherwise indicated.

*Example I*

84 g. dicyandiamide are charged into 54 cc. formaldehyde (100%) as a 38% solution. 30 g. ammonium chloride are added, and the pH measured at about 6.5. The temperature gradually rises to about 80° C. It is heated at about 95–98° for about 4 hours. The resulting solution is run into salt solution, the precipitate filtered and dried. The final pH of the condensation product, on solution in water, is about 5.5.

The following compositions were formulated by mixing the components in a mixer:

| | Examples | | | | | | | | | | | | | | | |
|---|---|---|---|---|---|---|---|---|---|---|---|---|---|---|---|---|
| | II | III | IV | V | VI | VII | VIII | IX | X | XI | XII | XIII | XIV | XV | XVI | XVII |
| Product of Example I | 50 | 50 | 50 | 50 | 50 | 50 | 50 | 50 | 50 | 50 | 40 | 60 | 50 | 50 | 50 | 50 |
| Copper acetate | 25 | 25 | 25 | 25 | 25 | 25 | | 25 | 25 | | 35 | 10 | 25 | 25 | 25 | 25 |
| Copper chloride | | | | | | | | | | 25 | | | | | | |
| Copper hydroxide | | | | | | | 15 | | | | | | | | | |
| Sodium acetate | 20 | | 3 | | 17 | | 15 | | | 20 | 5 | 15 | | 20 | 15 | 20 |
| Soda | | 10 | 10 | | | 10 | | | | | | | | | | |
| Borax | | | | 15 | | | | | | | | | | | | |
| Glycine | 5 | 15 | 12 | 10 | | | 20 | | | 5 | 20 | 15 | 5 | | | |
| Glutamic acid | | | | | 8 | 15 | | | | | | | | | | |
| Sarcosine | | | | | | | | | 25 | | | | | | 10 | |
| Dimethylglycine | | | | | | | | | | | 35 | | | | | |
| Dimethyl aspartic acid | | | | | | | | | | | | | | 5 | | |
| Aspartic acid | | | | | | | | | | | | | | | | 5 |

Example XVIII

A 2% dyeing on cotton of the dye produced by tetrazotizing 1 mole dianisidine and coupling with .5 mol 2-naphthol and .5 mol 1-amino-8-naphthol-2,4-disulfonic acid is aftertreated for 30 minutes at 160° F. with 2% based on the weight of the material of the above formulations II to XVII. The material is rinsed and dried. A noticeable improvement in wet-fastness and light-fastness is obtained on the dyeings treated in this manner in contrast to an untreated control.

Various modifications and variations of this invention will be obvious to a person skilled in the art and such variations and modifications are to be regarded as within the purview of this application and the spirit and scope of the appended claims.

I claim:

1. A composition for aftertreating dyeings and prints comprising from 10 to 100 parts of a copper compound selected from the group consisting of the readily water-dispersible hydroxide and salts of copper, from 2 to 50 parts of an α-aminocarboxylic acid capable of forming a soluble complex with the copper compound and from 0 to 45 parts of a buffering agent effective in maintaining the pH of the aftertreating composition within a range of about 5.5 to 7.0 for each 100 parts of an acidic condensation product of about 1.5 to 2.5 moles of formaldehyde, about 1 mole of dicyandiamide and about 0.5 to 1 mole of a water soluble easily ionizable ammonium salt of an acid, said acid being selected from the group consisting of inorganic and lower fatty acids.

2. The composition of claim 1 in which the buffering agent is selected from a group consisting of the acetates, formates and borates of ammonium and the alkali metals.

3. The composition of claim 2 in which the condensation product is formed in an acidic medium.

4. The composition of claim 3 in which the copper compound is water-soluble.

5. The composition of claim 4 in which the aminocarboxylic acid is selected from a group consisting of glycine, alanine, aminobutyric acid, leucine, phenylalanine, proline, aspartic acid, glutamic acid, dimethylglycine, dimethyl aspartic acid, and sarcosine.

6. The composition of claim 5 in which the aminocarboxylic acid is glycine.

7. The composition of claim 5 in which the aminocarboxylic acid is dimethylglycine.

8. The composition of claim 5 in which the aminocarboxylic acid is dimethylaspartic acid.

9. The composition of claim 5 in which the aminocarboxylic acid is sarcosine.

10. An aqueous bath comprising the composition of claim 1.

11. An aqueous bath comprising the composition of claim 5.

12. A process for increasing the wet fastness and light fastness properties of dyeings and prints on fibrous materials comprising treating such dyeings and prints with an aqueous bath as defined in claim 10 at a pH of about 5.5 to 7.0.

13. A process for increasing the wet fastness and light fastness properties of dyeings and prints on fibrous materials comprising treating such dyeings and prints with an aqueous bath as defined in claim 11 at a pH of about 5.5 to 7.0.

14. The composition of claim 1 in which the copper compound is water-soluble.

15. The composition of claim 1 in which the aminocarboxylic acid is selected from a group consisting of glycine, alanine, aminobutyric acid, leucine, phenylalanine, proline, aspartic acid, glutamic acid, dimethylglycine, dimethyl aspartic acid, and sarcosine.

16. An aqueous bath comprising the composition of claim 15.

17. An aqueous bath comprising the composition of claim 6.

18. A process for increasing the wet fastness and light fastness properties of dyeings and prints on fibrous materials comprising treating such dyeings and prints with an aqueous bath as defined in claim 16 at a pH of about 5.5 to 7.0

19. A process for increasing the wet fastness and light fastness properties of dyeings and prints on fibrous materials comprising treating such dyeings and prints with an aqueous bath as defined in claim 17 at a pH of about 5.5 to 7.0.

No references cited.